May 13, 1969  H. FRIELINGSDORF  3,443,277
APPARATUS FOR PRODUCING A LAMINATE HAVING
MECHANICALLY INTERLOCKING LAYERS
Filed Nov. 5, 1965

INVENTOR:
HANS FRIELINGSDORF
BY: J. H. McCarthy
HIS AGENT

3,443,277
APPARATUS FOR PRODUCING A LAMINATE
HAVING MECHANICALLY INTERLOCKING
LAYERS
Hans Frielingsdorf, Delft, Netherlands, assignor to Shell
Oil Company, New York, N.Y., a corporation of
Delaware
Filed Nov. 5, 1965, Ser. No. 506,525
Claims priority, application Netherlands, Nov. 27, 1964,
6413790
Int. Cl. B29f 3/012; B29c 19/00
U.S. Cl. 18—12                                3 Claims

ABSTRACT OF THE DISCLOSURE

Apparatus for producing a laminated thermoplastic body made up of separate components comprising an extrusion die head having separate extrusion channels for forming the separate components by extrusion, which channels lead to a common outlet channel for the thermoplastic body composed of the components and flow-disturbing means positioned between the separate extrusion channels at the point where the separate extrusion channels merge into the common outlet channel and contacting the adjacent surfaces of the components.

---

The invention relates to a method and apparatus for producing a body made up of separate components having plasticized thermoplastic surface layers by laying the layers of the separate components against each other.

Such a method may be used for the production of laminated hollow or solid articles, or for covering pipes or profiles with one or more layers, but it is of particular importance for the production of thin webs from two or more layers of thermoplastic material, so-called laminates, which are used, for example, in the packing industry. Each layer may consist of a different material possessing the properties desired for that particular layer.

With such composite bodies it is essential for the larly true in the case of layers which are not of unitary lying material to which they are applied. This is particularly true in the case of layers which are not of unitary construction themselves and specifically of laminates to prevent the sheets of thermoplastic material from becoming detached from each other making the laminate unsuitable for use. However, a firm bonding of the layers is also required in the case of coated pipes or fully enclosed profiles. In these latter articles, particularly in short sections of pipe or profiled elements, the coating should be firmly bonded to the underlying material to prevent axial displacement of the coating.

If the separate layers of different material do not already by themselves have a great adhesive strength with respect to each other, special measures are required to ensure proper bonding. Conventional measures such as gluing, thermal or ultrasonic welding are inadequate and it is often necessary to subject the layers to a special chemical surface treatment, for example an oxidizing treatment to increase the polarity of the surface. These operations are time-consuming or adversely affect the appearance of the finished article. Other drawbacks are that the bonding is only established in places, and that in the case of gluing the particular type of glue required has an unfavorable effect on the odor and/or taste of the packed goods.

The object of the invention is, therefore, to provide an improved method of producing articles or bodies from separate layers covered with or wholly consisting of thermoplastic material, in which a very firm binding between the separate components is obtained in a simple manner.

To this end the method according to the invention is characterized in that at the place where the components come into contact with each other the thermoplastic material of the surface layer of one component is caused to flow into the surface layer of the opposite component by means of a flow-disturbing element positioned between the components.

The invention also comprises an apparatus for producing a body of thermoplastic material made up of separate components which apparatus is provided with an extrusion die head having separate extrusion channels for forming the separate components by extrusion, which channels lead to a common outlet channel for the composite thermoplastic body, the said apparatus according to the invention being characterized in that a flow-disturbing element is positioned between the separate extrusion channels at the point where these separate extrusion channels merge into the common outlet channel.

The invention will now be further explained with reference to the drawings, wherein.

Figure 1:
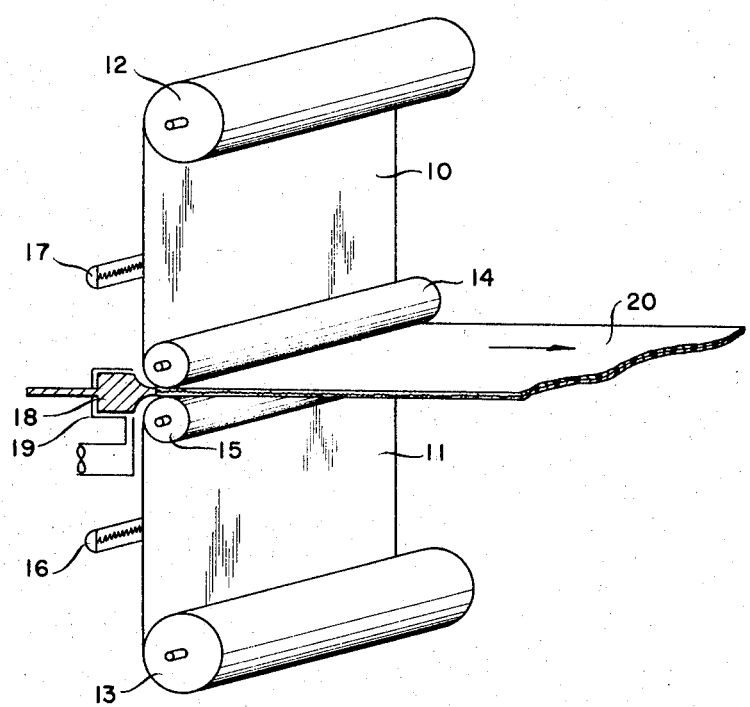
FIGURE 1 is a schematic isometric view showing a laminate being formed from two separate webs of film wound on supply reels.

Referring to FIGURE 1, two thermoplastic webs of film 10 and 11 are unwound from supply reels 12 and 13 respectively, and passed between two mill rolls 14 and 15. Before the webs 10 and 11 are passed between the mill rolls 14 and 15, the surfaces of the webs 10 and 11 to be laid against each other are heat-plasticized by means of heating elements 16 and 17 directed at these surfaces and positioned in front of the mill rolls 14 and 15 at a short distance therefrom.

Although the surfaces of the webs 10 and 11, heated to softening temperature, are pressed on to each other by the mill rolls 14 and 15, in many cases where these webs are produced of different thermoplastic materials, for example polystyrene and low-density polyethylene, the webs have no satisfactory adhesive strength with respect to each other. This drawback is eliminated according to the invention by positioning a flow-disturbing element, which in FIGURE 1 consists of a vibration element 18 provided with an electric heating element 19, between the mill rolls 14 and 15 at the point where the webs 10 and 11 converge.

The vibration element 18 may be connected to a vibration generator (not shown) for causing the vibration element 18 to vibrate parallel to the boundary surface between the two webs 10 and 11, in the direction of movement of the laminate 20 formed from the webs 10 and 11 and/or transversely to this direction of movement. The vibration element 18 may also be caused to vibrate in a direction perpendicular to the boundary surface between the two webs 10 and 11, either in combination with vibrations in the boundary surface or singularly. As a result of the vibrations minute quantities continually flow across the boundary surface from the boundary layer of one web into the boundary layer of the opposite web. The thermoplastic material flowing across the boundary surface between the webs 10 and 11 remains, however, united with the parent material, and in the boundary surface between the webs 10 and 11 the portions of material flowing back and forth into each other do not form a homogeneous blend. It has been found that after cooling of the laminate 20 the material of the boundary layer of one web is located in corresponding recesses of the boundary layer of the other web, and these recesses are often so shaped or, shortly after forming, are so deformed that the material of the other web is or becomes locked in these recesses. After cooling, the two webs are not, or are only to a relatively very small extent interconnected by adhesive forces. The strong binding is obtained mechanically by causing the two boundary layers to interlock. Thus, the two webs 10 and 11 can only be separated by forcibly tearing the layers apart, whereby the boundary layers are damaged.

Figure 2:
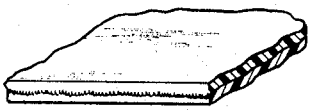
FIGURE 2 is an isometric view showing a laminate produced according to the invention.

The vibration element 18 is, of course, vibrated in such a manner that the transverse flow of the melted thermoplastic material only occurs in the boundary zone of the two webs lying against each other, so that the appearance of the webs is not impaired (FIGURE 2).

The method according to FIGURE 1 can be used with webs 10 and 11, which are wholly produced of thermoplastic material, as well as with webs made of another material and provided on the outside with a thermoplastic coating.

Figure 3:
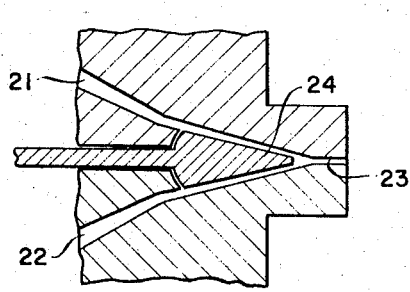
FIGURE 3 is a schematic sectional view showing a laminate being produced in an extrusion die head.

If the layers for producing the laminate wholly consist of thermoplastic material, the laminate can suitably be produced in an extrusion die head as shown in FIGURE 3. In this extrusion die head there are two slot-shaped extrusion channels 21 and 22, through which thermoplastic material can be extruded in a known manner, for example, by having the extrusion channels 21 and 22 connected to the discharge side of a screw extruder. The two extrusion channels 21 and 22 lead to a common outlet channel 23. At the point where the two extrusion channels 21 and 22 merge into the common channel 23 a flow-disturbing element 24 is positioned which may be coupled to a vibration generator. The means of creating the various vibrations and the operation of the flow-disturbing element 24 are the same as described with reference to the vibration element 18 of FIGURE 1. However, producing the laminate in an extrusion die head has the advantage that no additional heating of the thermoplastic material is required, since the material is already at the melting temperature.

Moreover, the risk that air may become entrapped in the laminate between the two layers is non-existent in this latter form. Producing the laminate according to the invention in the extrusion die head also has the advantage that the operations of extruding the separate layers and firmly bonding them together are effected in one step.

The flow-disturbing element may take many forms, whether it is incorporated in an extrusion die head, as is the case in FIGURE 3, or whether it is used as shown in FIGURE 1.

Some of these forms are shown in FIGURES 4 to 9 inclusive.

Figure 4:
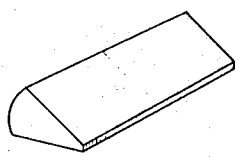
FIGURES 4 to 9 inclusive are isometric views showing various embodiments of flow-disturbing elements to be used in the invention.
Figure 5:
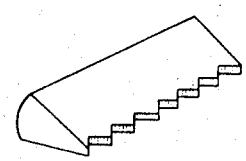

The flow-disturbing elements according to FIGURES 4 and 5 are vibration elements, which are connected to a vibration source for the purpose of effecting the transverse flows in the boundary surface between the components to be bonded. The vibration element according to FIGURE 4 consists of a plate tapered in the direction of movement of the laminate, whereas in the embodiment according to FIGURE 5 the plate of FIGURE 4 is provided with tooth-shaped recesses in its front edge.

Figure 6:
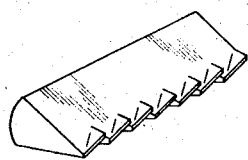
Figure 7:
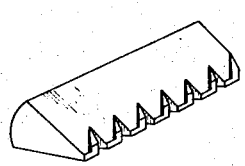
Figure 8:
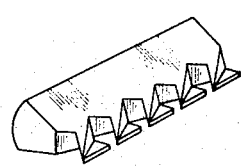
Figure 9:
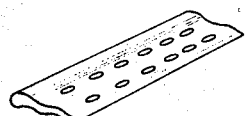

The flow-disturbing elements according to FIGURES 6 to 8 inclusive may likewise be coupled to a vibration source, but alternatively these elements may be positioned stationary, the desired transverse flow in the boundary surface of the laminate being obtained as a result of the disturbance of the flow of the melted material of the components along the disturbing element caused by the tongues or teeth turned outwardly at the front of the disturbing element. Finally, FIGURE 9 shows another embodiment of the flow-disturbing element, in which the element is corrugated in the direction of flow of the passing stream of thermoplasitc material and is provided with perforations.

The width of the disturbing elements is preferably equal to the width of the layers to be bonded, and, accordingly, in an extrusion die head it is equal to the width of the extrusion slit.

The invention allows for various modifications. The extrusion die head of FIGURE 3, for example, may incorporate more than two extrusion channels, all of which open into a common outlet channel 23. In this case a disturbing element is arranged between each pair of extrusion channels. For the purpose of producing tubes the extrusion slits are of annular form, the disturbing element likewise being of annular form and being positioned between the extrusion slits.

Finally, some examples are provided for producing, in accordance with the invention, a laminate composed of two layers in a 500 mm. wide extrusion die head of the type shown in FIGURE 3, in which the vibration element 24 is caused to reciprocate in the direction of flow of the laminate.

*Example I*

1st layer: polypropylene, specific gravity 0.9; thickness 0.5 mm.
2nd layer: high-density polyethylene, specific gravity 0.9; thickness 0.5 mm.; extrusion rate 6 m./min.
vibration element: amplitude 0.2 mm., frequency 525 cycles/second.

*Example II*

1st layer: polystyrene, specific gravity 1.05; thickness 0.1 mm.
2nd layer: low-density polyethylene; specific gravity 0.9; thickness 0.3 mm.; extrusion rate 5 m./min.
vibration element: amplitude 0.5 mm.; frequency 1700 cycles/second.

*Example III*

1st layer: polyvinylchloride, specific gravity 1.4; thickness 0.2 mm.
2nd layer: polypropylene, specific gravity 0.9; thickness 0.3 mm.; extrusion rate 4.75 m./min.
vibration element: amplitude 0.1 mm.; frequency 825 cycles/second.

I claim as my invention:

1. Apparatus for producing a laminated thermoplastic body made up of separate components comprising:
   (a) an extrusion die head having separate extrusion channels for forming the separate components by extrusion, which channels lead to a common outlet channel for the thermoplastic body composed of the components; and
   (b) flow-disturbing means positioned between the separate extrusion channels at the point where the separate extrusion channels merge into the common outlet channel and contacting the adjacent surfaces of the components.

2. Apparatus as defined in claim 1 wherein said flow-disturbing means includes an element adapted to be vibrated in several directions with respect to the common boundary surface.

3. Apparatus as defined in claim 1 wherein said flow-disturbing means includes an element having flow-interrupting portions projecting into the line of flow of the surface layer of at least one of the components.

References Cited

UNITED STATES PATENTS

| | | | |
|---|---|---|---|
| 1,649,756 | 11/1927 | Thornton | 161—228 |
| 3,219,742 | 11/1965 | Reinert | 156—306 X |
| 3,294,616 | 12/1966 | Linsley et al. | 156—73 X |
| 3,376,179 | 4/1968 | Balamuth | 156—73 |

EARL M. BERGERT, *Primary Examiner.*

T. R. SAVOIE, *Assistant Examiner.*

U.S. Cl. X.R.

18—13; 156—73, 244, 500; 264—70, 171